No. 704,240. Patented July 8, 1902.
B. CROSS.
WHEEL PLOW.
(Application filed May 8, 1902.)

(No Model.) 2 Sheets—Sheet 1.

Witnesses
Ira Graham
Ina Graham.

Inventor
Bradford Cross.
by L. P. Graham
His attorney.

THE NORRIS PETERS CO., PHOTO-LITHO., WASHINGTON, D. C.

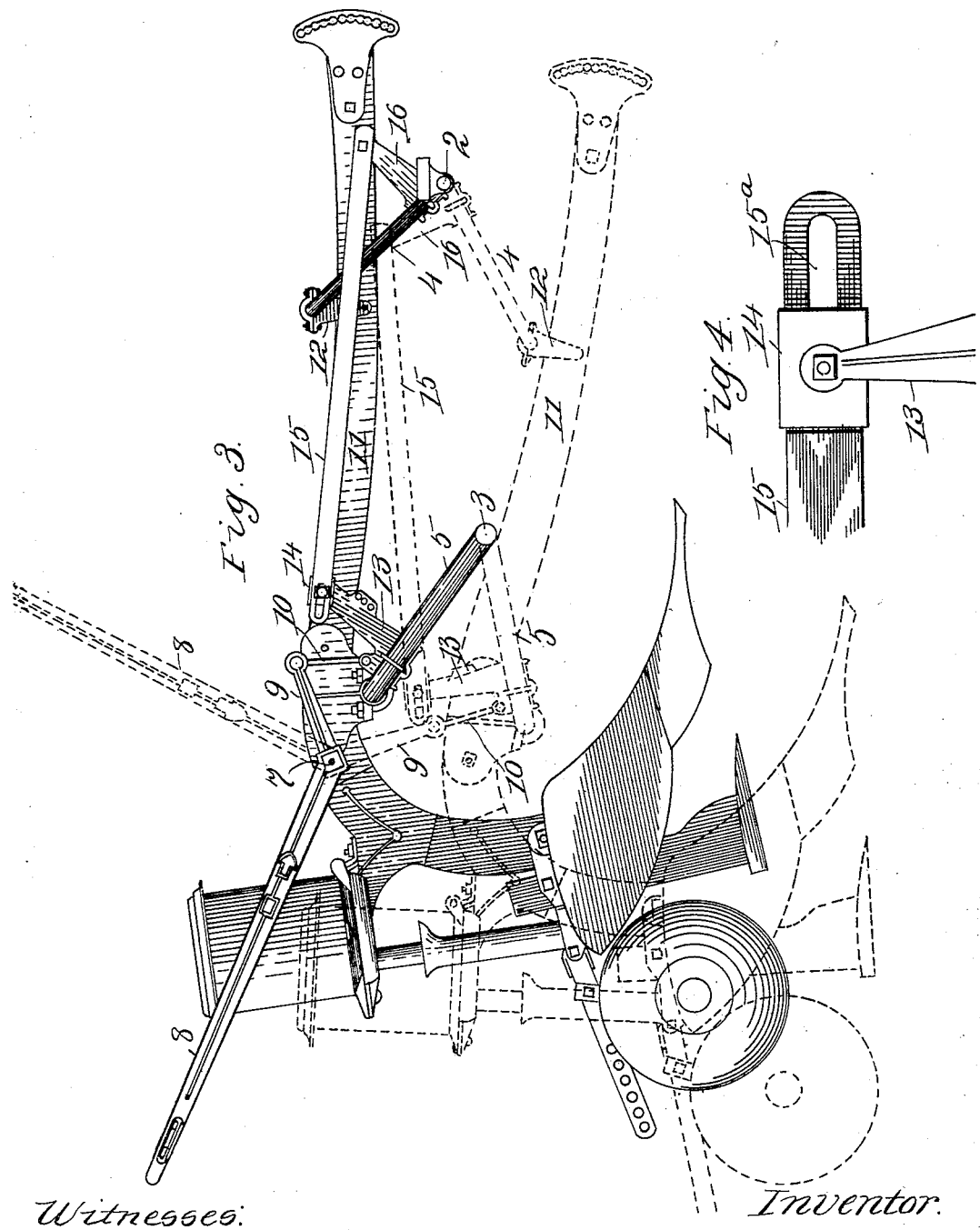

UNITED STATES PATENT OFFICE.

BRADFORD CROSS, OF CANTON, ILLINOIS, ASSIGNOR TO PARLIN & ORENDORFF COMPANY, OF CANTON, ILLINOIS, A CORPORATION OF ILLINOIS.

WHEEL-PLOW.

SPECIFICATION forming part of Letters Patent No. 704,240, dated July 8, 1902.

Application filed May 8, 1902. Serial No. 106,464. (No model.)

*To all whom it may concern:*

Be it known that I, BRADFORD CROSS, of the city of Canton, county of Fulton, and State of Illinois, have invented certain new and useful Improvements in Wheel-Plows, of which the following is a specification.

This invention is particularly applicable to lister-plows having planter attachments; and it relates to means for raising and lowering the plow-beam and to means for controlling the suck of the plow.

The invention is exemplified in the structure hereinafter described, and it is defined in the appended claims.

Figure 1:
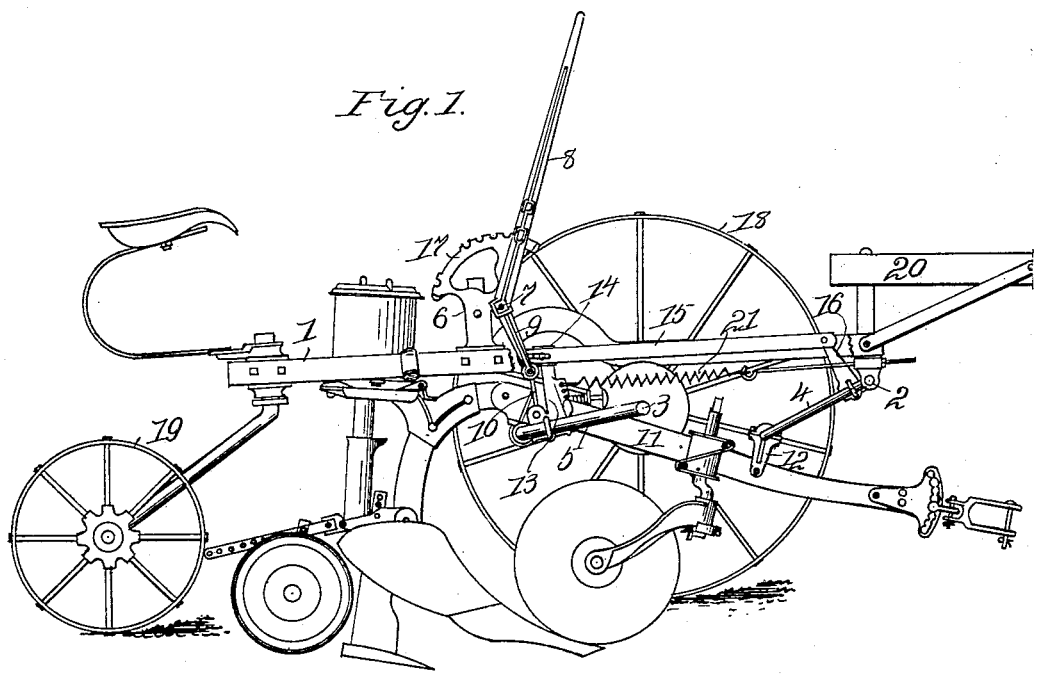
Figure 2:
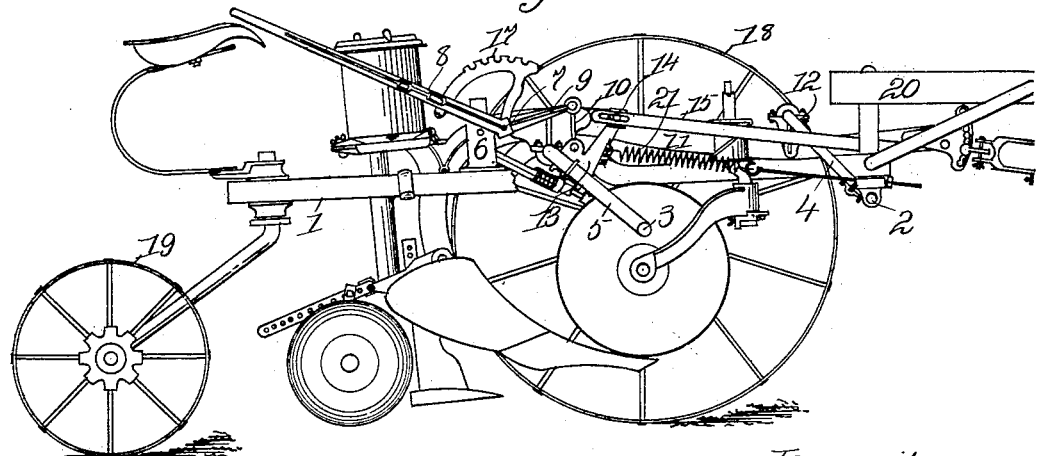

In the drawings forming part of this specification, Figure 1 is a side elevation of a combined plow and planter embodying my invention, a part of the plow-frame being broken away to expose the plow-beam and the beam being shown lowered into operative position. Fig. 2 is a side elevation similar to Fig. 1, except that the plow-beam and the adjuncts thereof are shown raised from contact with the ground. Fig. 5 is an enlarged detail of the parts most directly connected with my improvement, the plow and planter being shown in one position in solid lines and in another position in dotted lines. Fig. 4 is a detail of the adjusting device used to vary the suck of the plow, such detail being taken from the side opposite that shown in Fig. 3.

The frame 1 may be of any desired construction, and it is supported by wheels 18 and 19. A bail 4 is pivoted at its ends in bearings at 2. It extends rearward from its bearings, and it connects with the plow-beam through a swinging link 12. Another bail 5 is pivoted at 3 in bearings in the frame. It also extends rearward, and it connects pivotally at its rear end with a fixed bearing on the plow-beam. An arm 13 is rigidly attached to bail 5, and it extends upward therefrom. An arm 16 extends upward from bail 4 and is rigidly attached thereto, and a bar 15 is connected pivotally at its ends with arms 13 and 16. One of the ends of bar 15 is slotted lengthwise, as shown at 15ª in Fig. 4. A face of the bar is corrugated adjacent to the slot. A correspondingly-corrugated block 14 fits against the corrugated face, and a pin or bolt extends from the block through the slot. The arm 13 connects pivotally with block 14.

The block 14 is adjustable lengthwise of the bar 13, and by adjusting the block the ends of arms 13 and 16 may be brought more nearly together or held farther apart, and the relative inclination of bails 4 and 5 may be varied thereby. A lever 8 is pivoted at 7 on a rack-stand 6, attached to the plow-frame, and it has an extension 9, which connects with a lug on arm 13 through link 10. The lever 8 is a lock-lever, and the rack-stand has a notched sector 17, with which the lever coacts in holding the plow-beam in its various positions. The tongue of the plow is shown at 20, and at 21 is shown a spring which is preferably used to counterbalance the weight of the plow and the planting mechanism.

The lever 8 is swung back and forward to raise and lower the rearwardly-extending bail 5, and the motion of bail 5 is transmitted to bail 4 through arms 13 and 16 and the connecting-bar 15. The connection of bar 15 with arm 13 is farther from the pivot 3 of bail 5 than the extended end of arm 16 is from the pivot of bail 4, and consequently a certain movement of bail 5 will produce a more extended swing in bail 4. This causes the front end of the beam to rise and fall more rapidly than the rear end and gives the plow the pitch desired to make it readily penetrate the soil as the beam is lowered and ride out thereof as the beam is raised. The extent of swing of the bails is relatively invariable after block 14 has been fastened in any desired position; but the relative inclination of the bails may be varied somewhat by adjusting the block, and such variation will give the plow more or less suck by varying the angle the point of the plow forms with the soil while penetrating the same. The swinging link 12 permits adjustment of the bails and facilitates their operation.

The plow is in this instance shown provided with a seed-hopper, a subsoiler, and covering-disks in addition to the plow, and these may be of any desired construction. In a complete plow there is a pair of wheels 18, placed one on each side of the frame, and the rear caster-wheel 19 is preferably of the divided type to avoid picking up the soil above the seed and displacing the corn. The frame extends well in front of the spindles of wheels 18, so that the tongue has good control over the frame and enables straight driving to be easily effected. The two bails hold the beam against lengthwise tip and insure uniform depth of plowing after the lock-lever is once set in the desired position. The depth of planting is regulated by the lock-lever, and all movements of the beam are controlled by it alone.

While the invention is especially adapted for a combined lister plow and planter, it will readily be seen that the movements of the beam of any sulky-plow may be advantageously manipulated and controlled by the mechanism herein described.

I claim—

1. In a wheel-plow, the combination of a frame supported on wheels, a plow-beam having a plow attached thereto, a pair of bails pivoted in the frame, one in front of the other, and both connected pivotally with the plow-beam and a strut-bar to transmit the motion of one bail to the other.

2. In a wheel-plow, the combination of a frame supported on wheels, a plow-beam having a plow attached thereto, a bail pivoted in the frame and connected pivotally with the plow-beam, a second bail pivoted in the frame in front of the first-named bail, a swinging link connecting the front bail with the plow-beam, and a strut-bar to transmit motion from one bail to the other.

3. In a wheel-plow, the combination of a frame supported on wheels, a plow-beam having a plow attached thereto, a pair of bails pivoted in the frame, one in front of the other, with the rear bail connecting pivotally with the plow-beam, a swinging link connecting the front bail with the plow-beam, arms attached to the beams and extended upward therefrom, and a strut-bar connected pivotally at its ends with the arms of the bails, the connection of the rear end of the bar being farther from the pivot of the bail than the connection of the front end.

4. In a wheel-plow, the combination of a frame supported on wheels, a plow-beam having a plow attached thereto, a pair of bails pivoted in the frame, one in front of the other, with the rear bail connecting pivotally with the plow-beam, a swinging link connecting the front bail with the plow-beam, arms attached to the bails and extended upward therefrom, and an adjustable strut-bar connected at its ends with the arms of the bails and forming a longitudinally-extensible connection between the arms.

5. In a wheel-plow, the combination of a frame supported on wheels, a plow-beam having a plow attached thereto, a pair of bails pivoted in the frame, one in front of the other, and connected pivotally with the plow-beam, a strut-bar connecting the bails, a lift-lever, and a link connecting the lift-lever with the rear bail.

In testimony whereof I sign my name in the presence of two subscribing witnesses.

BRADFORD CROSS.

Witnesses:
W. F. MOORE,
C. B. CHANDLER.